United States Patent
Schäfer

(10) Patent No.: US 7,637,534 B2
(45) Date of Patent: Dec. 29, 2009

(54) COLD GAS GENERATOR

(75) Inventor: Dietmar Schäfer, Vienna (AT)

(73) Assignee: ISI Airbag GmbH (AT)

( * ) Notice: Subject to any disclaimer, the term of this patent is extended or adjusted under 35 U.S.C. 154(b) by 233 days.

(21) Appl. No.: 10/504,473

(22) PCT Filed: Oct. 9, 2002

(86) PCT No.: PCT/AT02/00290

§ 371 (c)(1),
(2), (4) Date: Aug. 12, 2004

(87) PCT Pub. No.: WO03/068567

PCT Pub. Date: Aug. 21, 2003

(65) Prior Publication Data

US 2005/0140128 A1    Jun. 30, 2005

(30) Foreign Application Priority Data

Feb. 14, 2002  (AT) .............................. GM 96/2002
Jul. 24, 2002  (AT) .............................. A 1122/2002

(51) Int. Cl.
*B60R 21/16* (2006.01)
(52) U.S. Cl. .................... 280/740; 280/741; 137/68.13; 137/68.23
(58) Field of Classification Search .............. 280/737, 280/740, 741; 137/68.13, 68.26, 68.25, 68.23
See application file for complete search history.

(56) References Cited

U.S. PATENT DOCUMENTS

| | | | |
|---|---|---|---|
| 4,998,750 A | | 3/1991 | Werner et al. |
| 5,513,572 A | * | 5/1996 | Frantom et al. ............. 102/531 |
| 5,542,702 A | * | 8/1996 | Green et al. ................ 280/737 |
| 5,593,180 A | | 1/1997 | Cuevas et al. |
| 5,632,505 A | * | 5/1997 | Saccone et al. ............. 280/737 |
| 5,803,493 A | * | 9/1998 | Paxton et al. ............... 280/737 |
| 5,890,735 A | | 4/1999 | Smith |
| 5,984,351 A | | 11/1999 | Pierotti et al. |
| 6,131,948 A | * | 10/2000 | Cuevas ....................... 280/737 |
| 6,168,202 B1 | | 1/2001 | Stevens |
| 6,206,414 B1 | * | 3/2001 | Cook et al. ................. 280/734 |

(Continued)

FOREIGN PATENT DOCUMENTS

DE    195 29 553 A1    2/1997

(Continued)

*Primary Examiner*—Toan C To
(74) *Attorney, Agent, or Firm*—McKee, Voorhees & Sease, P.L.C.

(57) ABSTRACT

A cold gas generator for inflating a gas bag with help of a gas flowing out of a gas pressure vessel (7) with a discharge opening (1) closed off by a destructible membrane (2) arched in a direction opposite relative to the stored gas, with destruction of the membrane (2) occurring by a hot gas jet aimed at the membrane (2), which jet is produced by ignition of a primer (4) which can be activated by application of an electric pulse. In the filled state of gas pressure vessel (7), the surface (6*a*) of membrane (2) which is averted from the same is directed in an exposed manner into a room (12) which is in connection with the gas bag via at least one discharge opening (11) and through which the hot gas jet is guided which is focused on the membrane (2) via a nozzle chamber (5).

4 Claims, 2 Drawing Sheets

U.S. PATENT DOCUMENTS

| | | |
|---|---|---|
| 6,217,065 B1 * | 4/2001 | Al-Amin et al. ............ 280/737 |
| 6,227,562 B1 * | 5/2001 | Shirk et al. ............... 280/730.2 |
| 6,237,950 B1 | 5/2001 | Cook et al. |
| 6,244,622 B1 | 6/2001 | Al-Amin et al. |
| 6,273,462 B1 * | 8/2001 | Faigle et al. ................ 280/737 |
| 6,412,811 B1 | 7/2002 | Campbell et al. |
| 6,629,703 B2 * | 10/2003 | Horton et al. ............... 280/737 |
| 7,032,925 B2 * | 4/2006 | Iwai et al. ................... 280/737 |
| 2002/0036399 A1 | 3/2002 | Nanbu |

FOREIGN PATENT DOCUMENTS

| | | |
|---|---|---|
| DE | 195 32 023 A1 | 3/1997 |
| DE | 201 14 665 U 1 | 1/2002 |
| EP | 1 336 538 A1 | 2/2003 |
| EP | 1 319 558 A1 | 6/2003 |
| GB | 2 312 274 A | 10/1997 |
| WO | WO 03/068567 A1 | 8/2003 |

* cited by examiner

COLD GAS GENERATOR

BACKGROUND OF THE INVENTION

1. Field of the Invention

The present invention relates to a cold gas generator for inflating a gas bag (airbag).

2. Description of Related Art

Such gas generators are used for inflating a gas bag with stored gas in the case of activation, e.g. an airbag in a car.

A problem encountered in the filling of airbags is the high temperature development which occurs especially in pyrotechnically generated gas, which in addition to the endangerment of the passengers, can also lead to the thermal destruction of the gas bag.

It is known with respect to hybrid gas generators which comprise both a pyrotechnic propellant charge as well as a cold gas source in the form of a gas storage means that the hot gas stream of a pyrotechnic propellant charge burns through a sealing element closing off the gas container. Such a propellant charge is usually ignited by a primer (an igniter provided with a jacket which contains in its interior a small quantity of a pyrotechnic priming charge which can be ignited via ignition pins which are guided into the propellant charge and to which an electric voltage is applied), which primer, with a charge of approximately 100 mg of pyroteclhnical material, has no significant influence on the output of the gas generator. Such a hybrid gas generator is disclosed in EP 699.231 A1 for example.

Cold gas generators are also known which omit the use of an additional propellant gas charge and exclusively use a primer for destroying the sealing element. This leads to the advantage that by omitting the additional propellant charge the temperature of the gas in the gas bag is reduced to the thermodynamic behavior of the employed gas in the gas pressure vessel, as a result of which the same is thus present in a virtually cold condition. Moreover, the production of poisonous residual matter is further prevented which originate from the burn-up of additional pyrotechnic propellant charges. Such a cold gas generator is disclosed in DE 100 38 673 A1 for example. The stream of hot gas as produced by the primer is guided in a small, enclosed space directly onto the sealing element, which is a membrane. As a result of the ignition of the primer in an enclosed space, a blast wave or shockwave is produced which destroys the sealing element. In order to produce this small enclosed room whose one side is delimited by the sealing element, high requirements are placed on the tubular support by the contact with the pressurized sealing element, leading to an unnecessary complex production. Moreover, the annular discharge cross section which is complex with respect to its flow dynamics and which is to be produced after the destruction of the sealing element causes insecurity with respect to the reproducibility of the opening behavior. A further disadvantage is that the filling and thus also the checking of the gas pressure vessel can only occur after the complete assembly of the cold gas generator because the sealing element would not withstand the interior pressure of the gas pressure vessel without additional support.

BRIEF SUMMARY OF THE INVENTION

It is the object of the present invention to provide a cold gas generator which comprises an opening mechanism which with respect to its structure is simple and highly reliable and simultaneously offers high security for the passengers and inflates the gas bag in a careful manner, without any likelihood of destruction.

It is a further object of the present invention to provide a cold gas generator which allows flexible production in which the filling and the checking of the gas pressure vessel is possible at a random time without any complete prior assembly of the cold gas generator.

This object is achieved in accordance with the invention by the characterizing features of claim 1.

As a result, no other components are in engagement at the loaded membrane during the production of the cold gas generator, thus increasing production security.

As a result of the central destruction of the membrane, a reliably reproducible discharge cross section can be obtained. The membrane is tight even without support and is thus not subjected to the likelihood of damage and thus destruction, so that during the production of the cold gas generator it is not necessary that the filling and checking of the gas pressure vessel needs to be performed as the last step.

The defined distance between the discharge opening and the outlet opening of the gas pressure vessel of the nozzle chamber lead to a reliable destruction of the membrane under all circumstances.

BRIEF DESCRIPTION OF THE DRAWINGS

There is now a detailed description of the invention, wherein.

DETAILED DESCRIPTION OF EXEMPLARY EMBODIMENTS OF THE INVENTION

Figure 1:
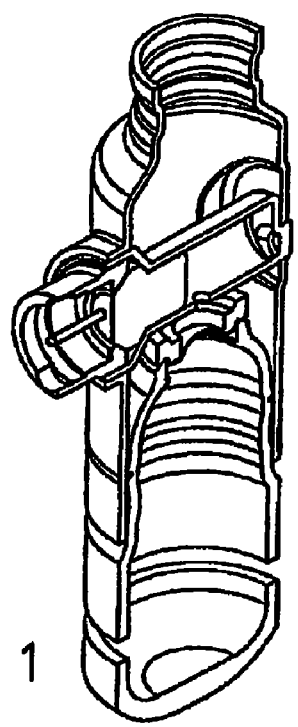
FIG. 1 shows a sectional front oblique view of an opening mechanism in accordance with the invention for a cold gas generator with axial gas exit.
Figure 2:
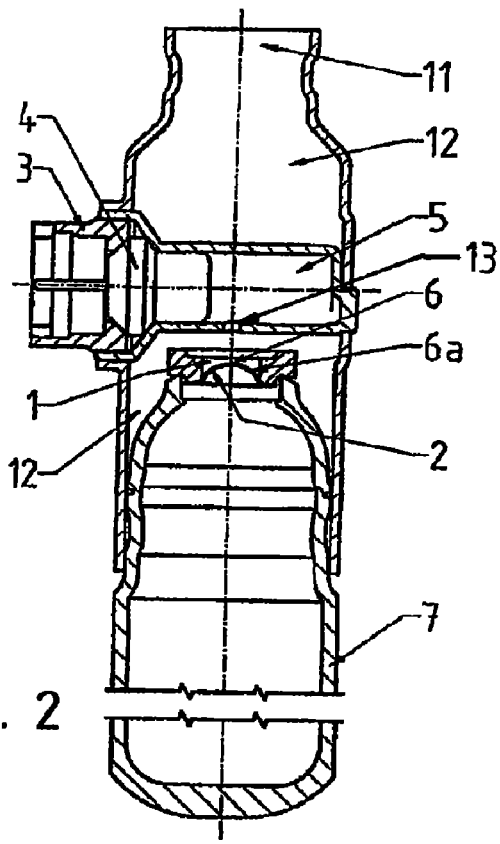
FIG. 2 shows a sectional view of an embodiment of an opening mechanism in accordance with the invention for a cold gas generator with axial gas exit.
Figure 3:
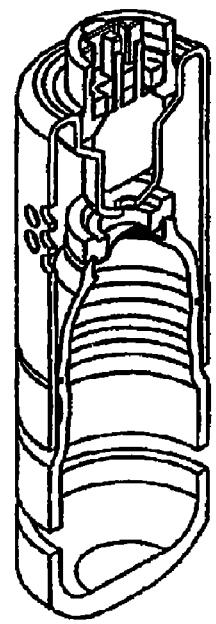
FIG. 3 shows a sectional front oblique view of an opening mechanism in accordance with the invention for a cold gas generator with radial gas exit.
Figure 4:
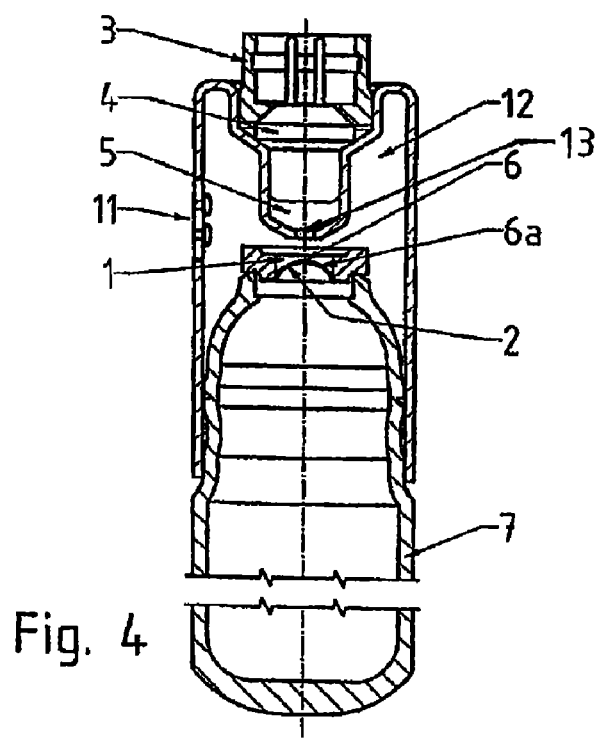
FIG. 4 shows a sectional view of an embodiment of an opening mechanism in accordance with the invention for a cold gas generator with radial gas exit.

FIGS. 1, 2, 3, 4 show a cold gas generator with an opening mechanism in accordance with the invention, with FIGS. 1 and 2 showing a discharge of the released gas in the axial direction and FIGS. 3 and 4 showing a discharge in the radial direction. The opening mechanism is arranged in the region above the discharge opening 1 of the gas storage means, which mechanism is used for destroying the membrane 2 and substantially consists of a primer fixing device 3, a primer 4 and a nozzle chamber 5.

Figure 5:
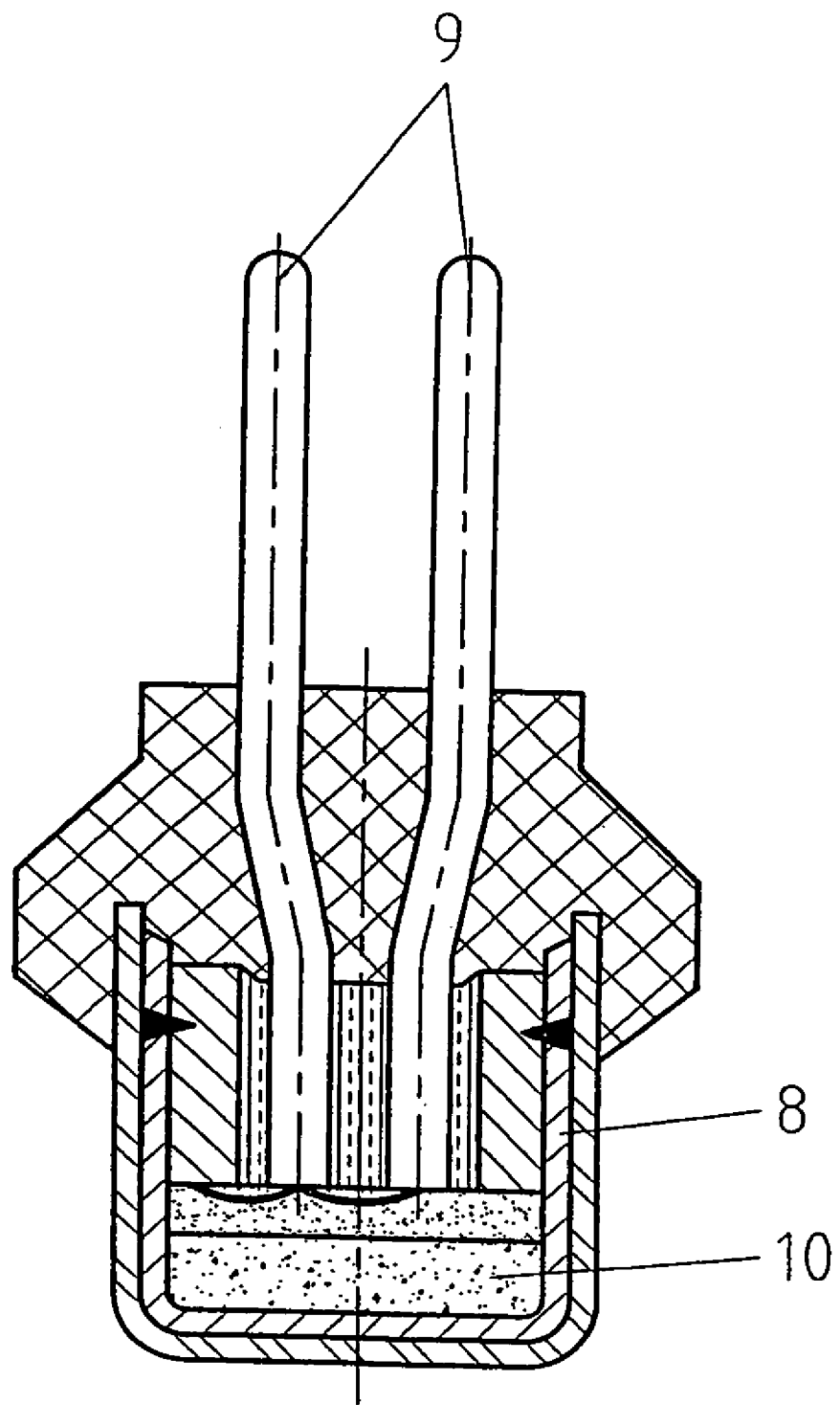
FIG. 5 shows a sectional view of a known primer.

The primer 4 concerns an igniter which has been known for a long time and whose principal configuration comprises a slight quantity of a priming charge 10 in a housing 8. Electrically contactable ignition pins 9 are guided into the priming charge 10 from the outside of the primer 4, which pins ignite the priming charge 10 (cf. FIG. 5) after the application of a voltage.

If the gas bag, and especially the air bag, is to be inflated, the primer 4 is ignited first as mentioned above by the application of an electric ignition pulse. The released energy is bundled in the nozzle chamber 5 and guided as a hot gas jet in a concentrated manner to the highest point 6 of the membrane 2 which closes off the discharge opening 1 of the gas storage means 7. The highest tension occurs at this point 6 in the course of the pressure load of the membrane 2 by the gas filling, as a result of which its thinnest position is obtained there. Since the material of the membrane 2 loses strongly in strength under the influence of heat, the partial heating by the directed hot gas jet causes a weakening and thus the destruction of the loaded membrane 2 in the region of the accessed point 6. The dynamics of the escaping, strongly compressed gas in the gas storage means 7 then produces the complete clearing of the discharge opening 1.

A destruction of the sealing element by a pressure wave or shockwave, for which a small, enclosed chamber would be required, is not desirable in the present case. It is entirely sufficient to focus the hot gas stream via the nozzle chamber in a directed manner on the sealing element. The sealing element can thus be situated in a completely exposed manner. Additional support is not required. The destruction of the sealing element occurs by thermal weakening. The internal pressure of the gas pressure vessel then destroys the thermally weakened sealing element.

In order to increase the release security even further and thus to minimize the failure probability, it is provided that the distance between the uppermost point of membrane 2 and the discharge opening 13 of the nozzle chamber 5 is smaller than or equal to the diameter of the discharge opening 1, i.e. the pressure-loaded cross section of the membrane 2. As a result, the complete destruction of the membrane is also ensured by the use of a conventional primer which can merely produce a low hot gas flow.

The invention claimed is:

1. A cold gas generator for inflating a gas bag by a stored gas flowing out of a gas pressure vessel assembly comprising a gas pressure vessel (7) provided with a discharge opening (1) which is closed off by a destructible membrane (2) which is arched in a direction which is opposite relative to the stored gas, and an opening mechanism comprising a primer (4) and a nozzle chamber (5), destruction of the membrane (2) occurring by internal pressure of the stored gas in the gas pressure vessel (7) after thermal weakening of the membrane (2) caused by a hot gas jet of the opening mechanism aimed at the membrane (2), which jet is exclusively produced by the ignition of the primer (4) which can be activated by application of an electric pulse, characterized in that the gas pressure vessel assembly is an independent and separable component, further characterized in that, in a filled state of the gas pressure vessel (7), a surface (6a) of the membrane (2) which is averted from the same stored gas is directed fully and in an exposed manner into a room (12) which surrounds a portion of the gas-pressure vessel assembly including the discharge opening (1) and membrane (2), and which is in communication with a gas bag via at least one discharge opening (11) in the room (12) and through which the hot gas jet is guided which is focused on the membrane (2) via a nozzle chamber (5), further characterized in that the distance between the uppermost point of the membrane (2) and a discharge opening (13) of the nozzle chamber (5) is substantially smaller than the diameter of the smallest discharge opening (1) of the gas pressure vessel (7).

2. A cold gas generator as claimed in claim 1, characterized in that the primer (4) comprises a propelling charge (10) enclosed by a housing (8), which charge can be ignited via ignition pins (9) guided into the propelling charge.

3. A cold gas generator as claimed in claim 1, characterized in that the membrane is made of a material with a tensile strength of more than 850 N/mm$^2$.

4. A cold gas generator as claimed in claim 1, characterized in that the discharge opening (13) of the nozzle chamber (5) comprises an outlet for the hot gas jet which is positioned at a wall of the nozzle chamber (5) acting as an elongated side wall of the primer (4).

* * * * *

UNITED STATES PATENT AND TRADEMARK OFFICE
CERTIFICATE OF CORRECTION

PATENT NO.       : 7,637,534 B2                                   Page 1 of 1
APPLICATION NO.  : 10/504473
DATED            : December 29, 2009
INVENTOR(S)      : Dietmar Schäfer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this

Ninth Day of November, 2010

David J. Kappos
*Director of the United States Patent and Trademark Office*